(12) United States Patent
Spry et al.

(10) Patent No.: US 6,260,544 B1
(45) Date of Patent: Jul. 17, 2001

(54) LOW FUEL VAPOR EMISSIONS FUEL SYSTEM

(75) Inventors: Timothy J. Spry, Rochester Hills; Raffi Dermanuelian, Grand Blanc, both of MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/561,892

(22) Filed: May 1, 2000

(51) Int. Cl.[7] ................................................. F02M 37/04
(52) U.S. Cl. ......................... 123/516; 220/721; 220/723
(58) Field of Search ................................. 123/516, 518; 220/4.14, 905, 721, 723

(56) References Cited

U.S. PATENT DOCUMENTS

| | | | |
|---|---|---|---|
| 3,067,810 | 12/1962 | Mozic | 158/50.1 |
| 3,752,355 | * 8/1973 | Weissenbach | 220/723 |
| 3,887,104 | * 6/1975 | Cole | 220/723 |
| 3,968,896 | * 7/1976 | Giacoletti et al. | 220/721 |
| 4,790,350 | 12/1988 | Arnold | 137/588 |
| 5,179,831 | * 1/1993 | Lampe | 60/39.142 |
| 5,526,795 | * 6/1996 | Thompson et al. | 123/516 |
| 5,722,374 | * 3/1998 | Kidokoro et al. | 123/516 |
| 5,868,120 | * 2/1999 | Van Wetten et al. | 123/518 |
| 5,913,451 | * 6/1999 | Madison | 220/723 |
| 5,979,481 | * 11/1999 | Ayresman | 220/721 |

* cited by examiner

Primary Examiner—Thomas N. Moulis
(74) Attorney, Agent, or Firm—Jeffrey A Sedlar

(57) ABSTRACT

A low fuel vapor emissions fuel system which reduces the need for FVCS and further obviates both the fuel pump and its return fuel line, composed generally of a rigid tank, a flexible fuel bladder within the tank, a filler pipe connecting between the fuel bladder and an exterior body location, a filler cap which removably seals the filler pipe, a fuel line from the fuel bladder to the engine, an air compression system for selectively pressurizing the cavity between the fuel bladder and the tank, and a fuel level sensor. In operation, when the ignition key is turned on, the air pump pressurizes the cavity between the tank and the fuel bladder. A program of the vehicle computer monitors the air pressure to provide a nominal fuel pressure for the engine. The air pump system further includes a vent valve, which also includes an over pressure relief valve. The filler door is interfaced with a sensor switch which is connected to a vent valve actuator; when the filler door is opened the vent valve opens to thereby relieve the pressure in the cavity. The filler cap is coupled with a cap actuator which prevents filler cap removal from the filler pipe unless fuel pressure in the fuel bladder has dropped to atmospheric pressure.

15 Claims, 3 Drawing Sheets

LOW FUEL VAPOR EMISSIONS FUEL SYSTEM

TECHNICAL FIELD

The present invention relates to automotive fuel systems.

BACKGROUND OF THE INVENTION

Automotive fuel systems require a fuel tank, a filler pipe and cap therefor for filling the tank with fuel, a fuel pump and associated fuel lines, and a fuel level sensor. The fuel tank has a rigid tank sidewall usually composed of a metallic or plastic material, wherein the tank sidewall contains the fuel. The filler pipe extends from an opening in the fuel tank to an external opening of the body of the vehicle. The filler cap is removably affixed to the filler pipe, so as to be removed by a driver when fueling the motor vehicle and reaffixed, such as by threading, when fueling is completed. The fuel pump is electrically operated, and is generally designed to deliver a predetermined flow rate of fuel to the engine via a delivery fuel line, and excess fuel is returned to the fuel tank via a return fuel line. Fuel level sensing may be accomplished by any modality known, including float based systems.

Fuel vapor emissions have become increasingly noted a concern which motor vehicle manufacturers must address. One source of fuel vapor emissions concerns tank ventilation, which must be provided so that fuel may be extracted from the fuel tank by the fuel pump, as the volume of fuel taken out by the pump is replaced by atmospheric pressure air. Unfortunately, this same ventilation provision allows escape of fuel vapors. Another fuel vapor emissions problem concerns refueling, whereduring fuel displaces fuel vapor from the tank. To overcome this vapor emissions source, a fuel vapor control system (FVCS) must be included with the fuel system of the vehicle. A typical FVCS includes vapor lines, a carbon canister, a purge solenoid, a vent solenoid, an onboard refueling vapor recovery system, and an onboard diagnostics II (OBD II) pressure sensor.

It would be extremely beneficial if somehow a fuel system could be devised which has fuel vapor emission levels that are very low.

SUMMARY OF THE INVENTION

The present invention is a low fuel vapor emissions fuel system which reduces the need for FVCS and further obviates both the fuel pump and its return fuel line.

The low fuel vapor emissions fuel system includes a rigid tank, a flexible fuel bladder within the tank, a filler pipe connecting between the fuel bladder and an exterior body location, a filler cap which removably seals the filler pipe, a fuel line from the fuel bladder to the engine, an air compression system for selectively pressurizing the cavity between the fuel bladder and the tank, and a fuel level sensor.

In operation, when the ignition key is turned on, the air pump pressurizes the cavity between the interior of the tank and the exterior of the fuel bladder. The pressure is monitored by a pressure transducer which is connected to the vehicle computer. A program of the vehicle computer compares the output from the transducer to the fuel pressure required by the engine and accordingly turns on and off the air pump as needed. An air intake filter is used to prevent contaminants (dirt, water, etc.) from entering the tank through the air pump system. The air pump system also includes an air pressure check valve which is located between the air intake filter and the pressure transducer. The air pressure check valve prevents air from escaping from the tank when the air pump is turned off. The air pump system further includes a vent valve, which also includes an over pressure relief valve. The over pressure relief valve is a safety feature that would open and relieve tank pressure in the event that the tank pressure exceeded a predetermined value.

Fuel is delivered to the engine through the fuel line which is connected to a fuel line attachment on the tank. As the engine uses fuel, the pressure in the tank decreases due to the reduction in volume of fuel in the fuel bladder. The pressure transducer output correspondingly changes, and the program of the vehicle computer turns on the air pump as needed to maintain pressure in the tank. The fuel line attachment includes a shut-off valve which would be open (allowing fuel delivery to the engine) while the engine is cranking or running and closed (prevents fuel from entering the fuel line) while the engine is off.

To add fuel to the tank, the operator would open a filler door. The filler door is interfaced with a sensor switch which is connected to the vehicle computer or directly connected to the air pump system. When the fuel door is opened, a vent valve actuator triggers the vent valve to open, thereby relieving the pressure in the tank. The filler cap is coupled with a cap actuator which prevents filler cap removal from the filler pipe unless fuel pressure in the fuel bladder has dropped to atmospheric pressure. The filler pipe includes a grommet that the fuel station nozzle fits through. The grommet reduces the likelihood of air being drawn into the fuel bladder during filling. Also, the filler pipe is attached to the tank at a location that will allow residual air to escape from the fuel bladder prior to the fuel cap being replaced. The filler pipe further has a filler pipe check valve which selectively prevents pressurized fuel from exiting the fuel bladder. As the fuel bladder is pressurized during vehicle operation, the filler neck check valve is forced closed. The filler pipe check valve has a low reopening pressure which prevents air from entering the fuel bladder when the fuel cap is removed. When fuel is added to the vehicle, the filler pipe check valve will reopen without causing the fuel fill nozzle to shut off prematurely.

There would not be any fuel vapor in the fuel bladder. The only vapor space in the system would be in the filler pipe between the filler pipe check valve and the fuel cap. This vapor volume would be separated from the fuel by the filler pipe check valve. Any leakage of the filler pipe check valve would be a liquid leak into the filler pipe and would be contained by the filler pipe and the fuel cap. FVCS would not be required since there would be no air or fuel vapor inside the fuel bladder that would be displaced during refueling. The air in the tank would be displaced during refueling, but that air would not contain any fuel vapors.

Several benefits of the low fuel vapor emissions fuel system include: lack of fuel vapor emissions to the atmosphere, elimination of an electric fuel pump in contact with fuel, elimination of a fuel sensor submerged in the fuel, elimination of FVCS, redundant fuel containment, and fuel flow unaffected by temperature and battery voltage.

Accordingly, it is an object of the present invention to provide a low fuel vapor emissions fuel system for a motor vehicle.

This, and additional objects, advantages, features and benefits of the present invention will become apparent from the following specification.

DETAILED DESCRIPTION OF THE PREFERRED EMBODIMENT

Figure 1:
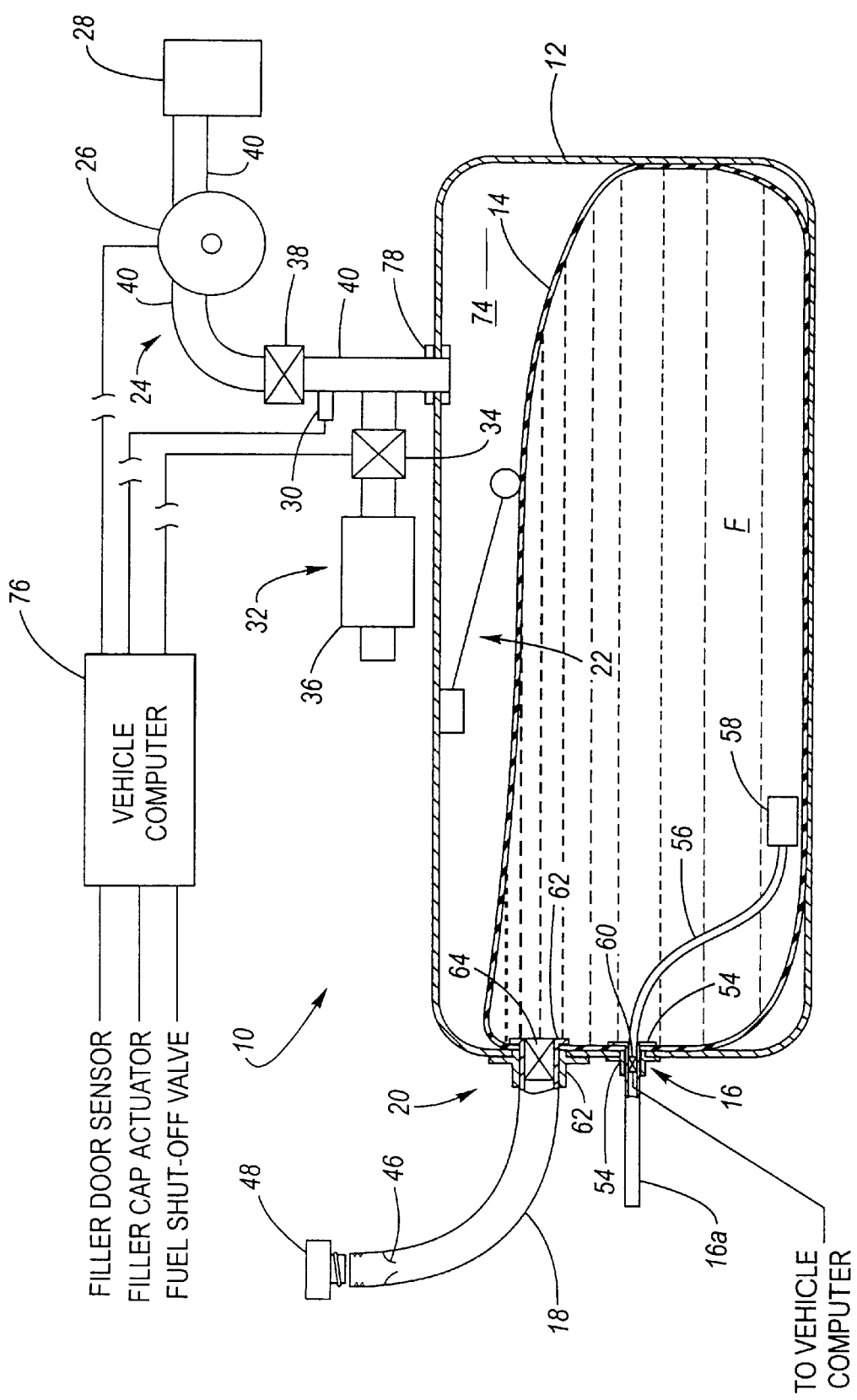
FIG. 1 is a partly sectional side view of the low fuel vapor emissions fuel system according to the present invention, wherein the fuel bladder is shown substantially full.

Referring now to the Drawing, FIG. 1 depicts a low fuel vapor emissions fuel system 10 for a motor vehicle. The low fuel vapor emissions system 10 includes a rigid tank 12, a very flexible fuel bladder 14 located within the tank, a fuel line attachment 16 for connecting a fuel line 16a to the tank and the bladder, a filler pipe 18, a filler pipe attachment 20 for attaching the filler pipe to the tank and the bladder, a fuel level sensor 22, and an air pump system 24. The air pump system 24 includes an air pump 26, an air intake filter 28, a pressure transducer 30, an exhaust system 32 with a vent valve 34 and a muffler 36, a check valve 38, and interconnecting air pipes 40. A fill regulator system 42 is further provided (see FIG. 3), a grommet 46, a fuel cap 48, as well as a filler door sensor 50 and a filler cap actuator 52 (see FIG. 3).

The tank 12 is structured to withstand the fuel pressure required by the engine, being preferably composed of metal, but may be composed of an alternative material, such as a plastic or a composite. The fuel bladder 14 is molded to the shape of the inside of the tank 12. The fuel bladder 14 is made of a very flexible material with very low fuel permeability, as for example Butadiene/Acrylonitrile (NBR) with a tetrafluorethylene-hexafluoropropylene (THV) barrier layer. The fuel bladder 14 is size variable and expands as it is filled with fuel when fuel F is added thereto. The tank 12 is not exposed to the fuel, in that the fuel is completely contained by the fuel bladder 14.

Fuel F is delivered to the engine (not shown) through a fuel line 16a which is connected to the fuel line attachment 16. The fuel line attachment 16 includes a fitting 54 which sealingly connects with the tank 12 and the bladder 14. A bladder line 56 terminates in a filtered inlet 58. The fuel line attachment 16 includes a fuel shut-off valve 60 which is open to allow fuel to pass to the engine while the engine is cranking or running and is closed to thereby prevent fuel F from entering fuel line 16a while the engine is off. The fuel shut-off valve 60 is preferably computer controlled, as will be discussed hereinbelow.

Figure 2:
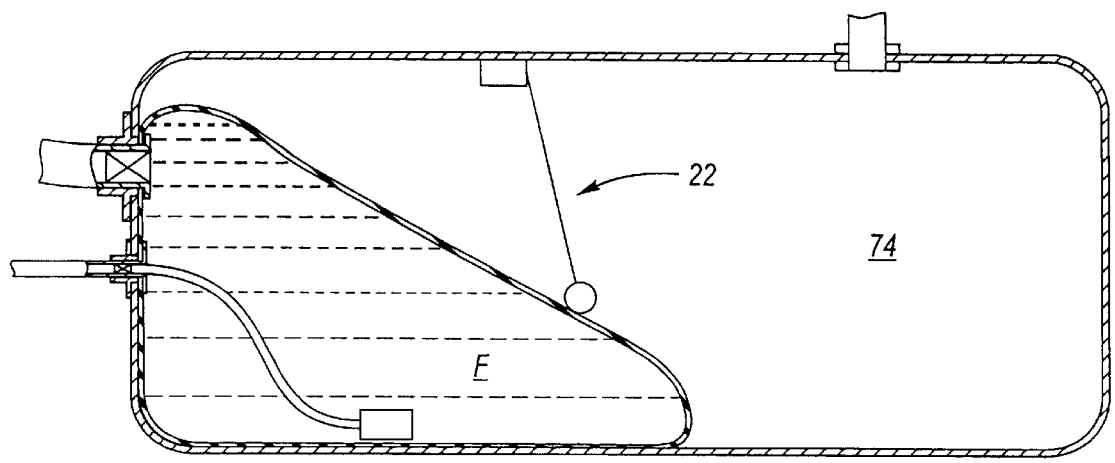
FIG. 2 is a partly sectional side view of the low vapor emissions fuel system, wherein the fuel bladder is shown substantially empty.

The filler pipe attachment 20 is sealingly secured to the tank 12 and the bladder 14 via a fitting 62. The filler pipe attachment 20 contains a filler pipe check valve 64 which prevents pressurized fuel from exiting the fuel bladder 14 and filling the filler pipe 18. As the fuel bladder 14 is pressurized during vehicle operation, the filler pipe check valve 64 is forced closed by fluid pressure. The filler pipe check valve 64 has a low reopening pressure which prevents air from entering the fuel bladder 14 when the filler cap 48 is removed. Alternatively, the filler pipe check valve can be electronically actuated by command from the vehicle computer. When fuel is added to the vehicle, the filler pipe check valve 64 will reopen without causing the fuel station fill nozzle to shut off prematurely. The filler pipe 18 also includes a grommet 46 that the fuel station fill nozzle fits through. The grommet 46 reduces the likelihood of air being drawn into the fuel bladder 14 during fueling. The filler pipe attachment 20 is located so that residual air in the fuel bladder 14 is able to escape prior to the filler cap 48 being replaced. FIG. 1 depicts the fuel bladder 14 when nearly full of fuel F, and FIG. 2 depicts the bladder condition when fuel F is nearly exhausted.

Figure 3:
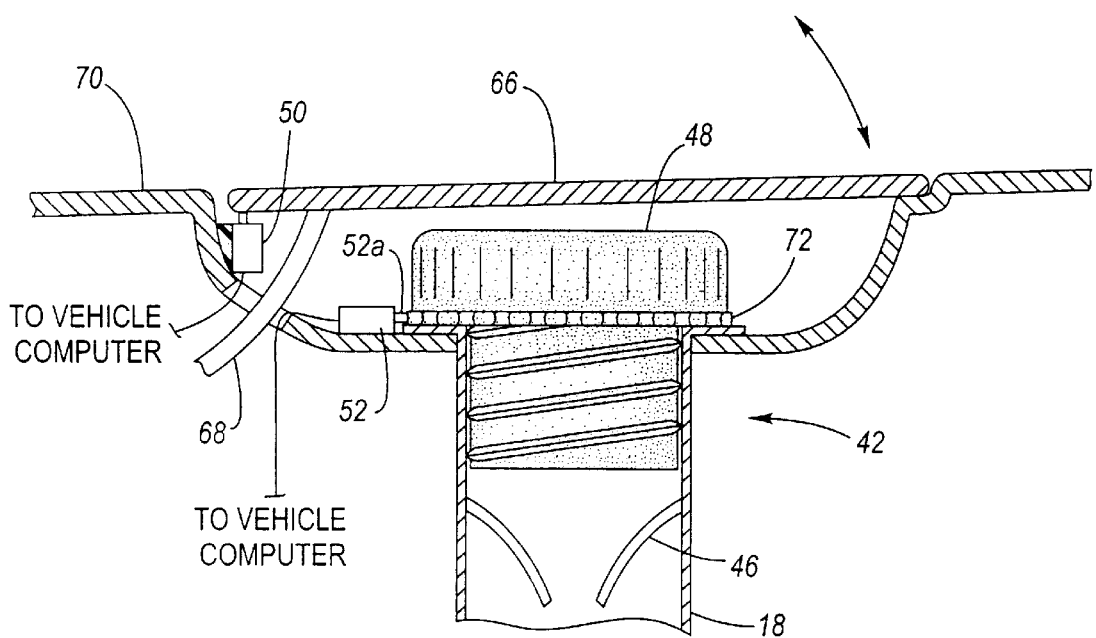
FIG. 3 is a partly sectional side view of a filler cap control system of the low fuel vapor emissions fuel system according to the present invention.

FIG. 3 depicts an example of a fill regulator system 42. The filler cap 48 is threadably engaged with the filler pipe 18. The filler cap 48 provides an air tight seal when tightened. The filler cap 48 is protected and hidden behind a filler door 66. The filler door is hingeably attached 68 to the vehicle body 70 in optionally a spring biased closed modality. A filler door sensor 50 detects the closed and open states of the filler door 66, and provides a signal to the vehicle computer for operating the vent valve 34. In this regard, it is preferred for the filler door 66 to be openable only by the user, as by a key or a switch within the passenger compartment. Further, a filler cap actuator 52 is provided which is capable of interferingly engaging the filler cap 48 so as to prevent its removal. In the example shown, the filler cap 48 includes an annularly toothed portion 72 wherein an actuator pin 52a interferingly engages a slot between the teeth when extended. When the actuator pin 52a is retracted, the filler cap is free to rotate. As will be discussed below, the fill regulator system 42 ensures that the filler cap 48 will be removed only when the fuel bladder is at atmospheric pressure. The air pump 26 of the air pump system 24 is any commercially available air pressurizing device, which, for example, may be of the centrifugal type, and which is able to deliver pressures in excess of the fuel pressure needed by the engine. The air filter 28 includes a housing and a replaceable filter element of a conventional type. The check valve 38 is a one-way gas valve of conventional type. The pressure transducer 30 is a conventional pressure sensor having a voltage output responsive to differential gas pressure between the atmosphere and the pressure in the cavity 74 formed between the fuel bladder 14 and the tank 12. The output from the pressure transducer 30 is connected to the vehicle computer 76. The vent valve 34 is controlled open or closed by the vehicle computer 76, wherein the muffler 36 provides a quiet discharge of air from the cavity 74 when the vent valve is opened. The vent valve 34 includes an over pressure relief (poppet) valve. The over pressure relief valve is a safety feature that would open and relieve tank pressure in the event that the tank pressure exceeded a predetermined value. The air pipes 40 provide a sealed interconnection of the aforesaid components with respect to the tank 12, via a fitting 78 such that the vent valve 34 and the air pump 26 communicate with the cavity 74.

Figure 4:
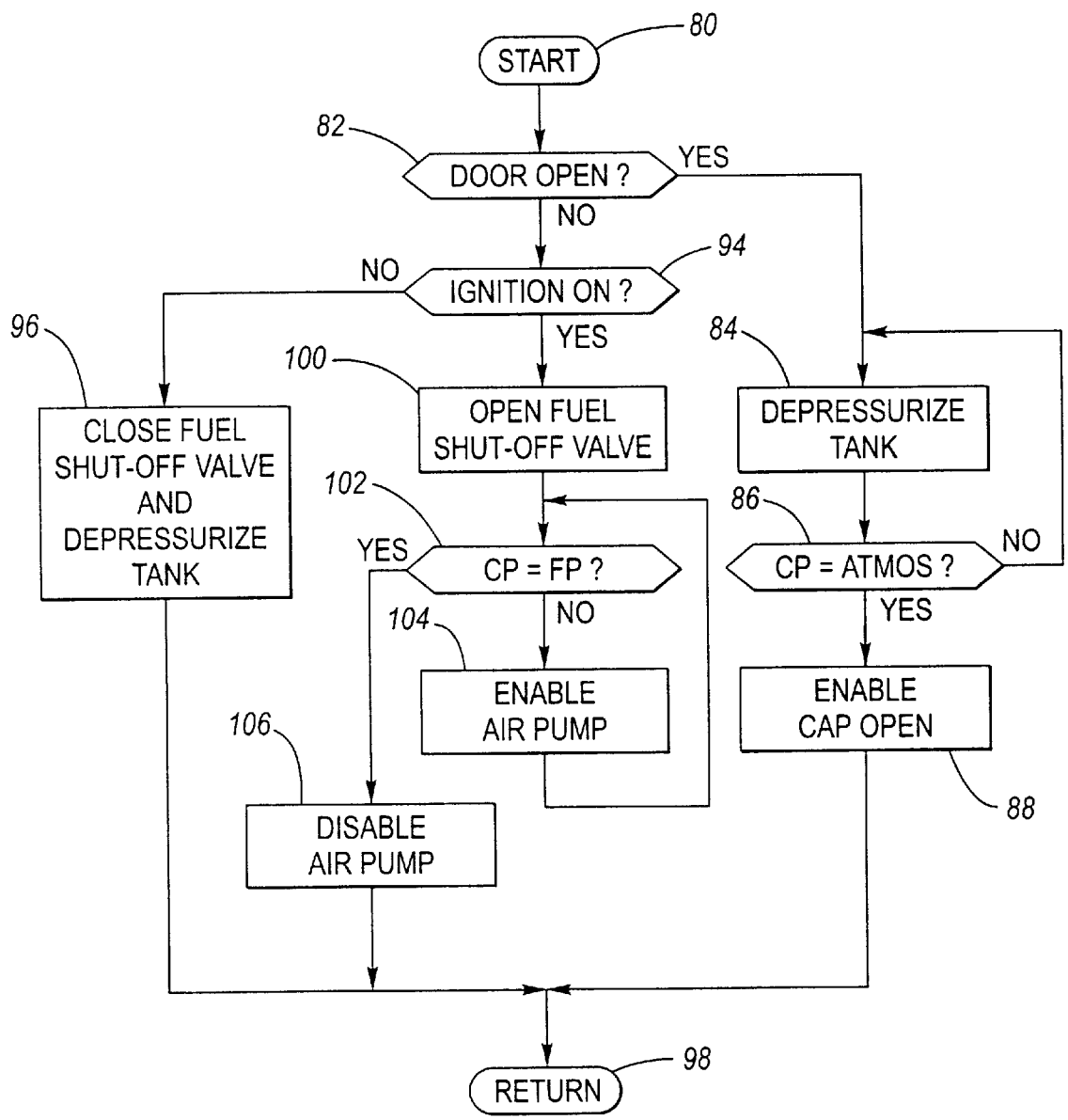
FIG. 4 is a flow chart of a program for implementing the control functions of the low fuel vapor emissions fuel system according to the present invention.

FIG. 4 depicts a flow chart for a program for the vehicle computer 76 which enables the low fuel vapor emissions fuel system 10.

At start block 80 the program is initialized. At decision block 82, the program inquires whether the filler door is open. If yes, this indicates a fueling scenario is about to begin. Consequently, the program, at execution block 84, sends a signal to the vent valve to open so that the cavity pressure (CP) within the tank can achieve atmospheric. If the pressure transducer indicates cavity pressure has acquired atmospheric at decision block 86, then the program, at execution block 88, actuates the filler cap actuator to allow the filler cap to be removed from the filler pipe. Now fueling can ensue. The program then returns at execution block 90 to await completion of refueling and the closure of the filler door at execution block 82.

If at decision block 82 the filler door is closed, the program then inquires at decision block 94 whether the ignition is on. If not, the program, at execution block 96, sends a signal to close the fuel shut-off valve and depressurize the cavity, and then, at execution block 98, returns to the start block 80.

If at decision block 94 the ignition is on, then the program, at execution block opens the fuel shut-off valve. The program then inquires at decision block 102 whether the cavity pressure CP is equal to a nominal fuel pressure FP for operation of the engine. This pressure can vary depending on engine operating conditions and is an input to the vehicle computer. If the cavity pressure is lower than the nominal fuel pressure, the program, at execution block 104 sends a signal to the air pump 26 to operate. If at decision block 102, the cavity pressure is at the required fuel pressure, the air pump is turned off at execution block 106 and, at execution block 108, the program returns to the start block 80.

To those skilled in the art to which this invention appertains, the above described preferred embodiment may be subject to change or modification. Such change or modification, such as for example a modification of the shape of the resilient lock arms, can be carried out without departing from the scope of the invention, which is intended to be limited only by the scope of the appended claims.

What is claimed is:

1. A low fuel vapor emissions fuel system for a motor vehicle comprising:
    a rigid tank;
    a flexible fuel bladder located inside said tank;
    a filler pipe having a first end and an opposite second end, said first end communicating with said fuel bladder;
    a filler cap for removably covering said second end of said filler pipe;
    a fuel line communicating with said fuel bladder;
    an air compression system communicating with a cavity formed between said tank and said fuel bladder, wherein said air compression system selectively pressurizes air in said cavity to thereby provide fuel pressure in said fuel line; and
    a fuel level indicator interfaced with said fuel bladder.

2. The fuel system of claim 1, wherein said air compression system comprises:
    an air pump, said air pump being selectively activated to pressurize air in said cavity;
    an air check valve for retaining air pressure in said fuel bladder when said air pump is deactivated;
    a vent valve for selectively releasing air pressure in said cavity;
    an air pressure transducer for indicating air pressure in said cavity; and
    piping for sealably connecting said air pump, said air check valve, said vent valve and said air pressure transducer to said cavity.

3. The fuel system of claim 2, wherein said air compression system further comprises:
    an over pressure relief valve connected to said piping; and
    an air intake filter connected to an air intake of said air pump.

4. The fuel system of claim 1, further comprising a fuel shut-off valve connected to said fuel line.

5. The fuel system of claim 1, further comprising a fuel check valve located at said first end of said filler pipe, said fuel check valve closing in response to air pressure in said cavity exceeding a predetermined value above atmospheric pressure.

6. The fuel system of claim 5, further comprising an actuator for selectively preventing removal of said filler cap responsive to said air pressure transducer indicating a cavity air pressure substantially in excess of atmospheric pressure.

7. The fuel system of claim 6, wherein the motor vehicle has a filler door openable to gain user access to said filler cap; said fuel system further comprising a sensor to sense opening of the filler door, wherein said vent valve opens to release air pressure in said cavity responsive to said sensor detecting opening of said filler door.

8. The fuel system of claim 2, further comprising:
    a fuel shut-off valve connected to said fuel line; and
    an over pressure relief valve connected to said piping.

9. The fuel system of claim 8, further comprising a fuel check valve located at said first end of said filler pipe, said fuel check valve closing in response to air pressure in said cavity exceeding a predetermined value above atmospheric pressure.

10. The fuel system of claim 9, further comprising an actuator for selectively preventing removal of said filler cap responsive to said air pressure transducer indicating a cavity air pressure substantially in excess of atmospheric pressure.

11. The fuel system of claim 10, wherein the motor vehicle has a filler door openable to gain user access to said filler cap; said fuel system further comprising a sensor to sense opening of the filler door, wherein said vent valve opens to release air pressure in said cavity responsive to said sensor detecting opening of said filler door.

12. The fuel system of claim 11, further comprising an electronic control system for controlling operation of at least said air compressor, said vent valve, said fuel shut-off, and said actuator responsive to said door sensor and said air pressure transducer.

13. A low fuel vapor emissions fuel system for a motor vehicle comprising:
    a rigid tank;
    a flexible fuel bladder located inside said tank;
    a filler pipe having a first end and an opposite second end, said first end communicating with said fuel bladder;
    a filler cap for removably covering said second end of said filler pipe;
    a fuel line communicating with said fuel bladder;
    an air compression system communicating with a cavity formed between said tank and said fuel bladder, wherein said air compression system selectively pressurizes air in said cavity to thereby provide fuel pressure in said fuel line;
    an air pressure transducer for indicating air pressure in said cavity;
    a fuel level indicator interfaced with said fuel bladder; and
    an electronic control system for controlling operation of said air compression system responsive to said air pressure transducer.

14. The fuel system of claim 13, further comprising an actuator for selectively preventing removal of said filler cap responsive to said electronic control system receiving a signal from said air pressure transducer that cavity air pressure substantially exceeds of atmospheric pressure.

15. The fuel system of claim 14, wherein the motor vehicle has a filler door openable to gain user access to said filler cap; said fuel system further comprising a sensor to sense opening of the filler door, wherein said electronic control system causes said air compression system to release air pressure in said cavity responsive to said sensor detecting opening of said filler door.

* * * * *